United States Patent [19]

Weeden

[11] Patent Number: 4,572,233

[45] Date of Patent: Feb. 25, 1986

[54] LINED CHECK VALVE

[76] Inventor: Frank G. Weeden, P.O. Box 55156, Houston, Tex. 77255

[21] Appl. No.: 480,268

[22] Filed: Mar. 30, 1983

[51] Int. Cl.$^4$ ............................................. F16K 15/04
[52] U.S. Cl. ................................. 137/375; 137/533.31
[58] Field of Search ................... 137/375, 528, 533.21, 137/533.31, 543; 251/318, 330

[56] References Cited

U.S. PATENT DOCUMENTS

| | | | |
|---|---|---|---|
| 2,202,735 | 5/1940 | Johnson | 137/375 |
| 3,498,315 | 3/1970 | Graves et al. | 137/375 |
| 3,750,698 | 8/1973 | Walchle et al. | 137/375 |
| 4,224,961 | 9/1980 | Schnabel | 137/375 |
| 4,368,756 | 1/1983 | Carlson | 137/543 |
| 4,437,492 | 3/1984 | Taylor | 137/543.13 |

Primary Examiner—Martin P. Schwadron
Assistant Examiner—Sheri M. Novack
Attorney, Agent, or Firm—Browning, Bushman, Zamecki & Anderson

[57] ABSTRACT

A check valve in which one half of the valve body has a number of integral guide fins extending radially into the flowway. The guide fins are discontinuous from one another at their radially inner ends. A liner on the interior of the valve body follows the contour of the guide fins so that the portions of the liner which cover respective guide fins are likewise discontinuous from one another at their radially inner ends. The thermal properties of the liner differ from those of the guide fins. Each of the guide fins has a transverse bore through which extends an anchoring plug, the plug in turn interconnecting portions of the liner on opposite sides of the guide fins. A valve element longitudinally reciprocable in the flowway includes a closure portion for engagement with a valve seat and an elongate valve stem extending longitudinally from the closure portion and surrounded by and slidably engaged with the lined inner ends of the guide fins.

23 Claims, 2 Drawing Figures

LINED CHECK VALVE

BACKGROUND OF THE INVENTION

The present invention pertains to check valves and, more specifically, to those check valves in which the valve body, typically formed of metal, has its interior lined with another material. It has become particularly popular to line such check valve bodies with suitable polymeric materials, although certain aspects of the invention may likewise be applicable to valve bodies and liners formed, for example, of two different metals. The respective materials of the valve body and liner often have different thermal properties and, more particularly, much different coefficients of thermal expansion.

In many instances, it is necessary, or at least desirable, to provide an accurate alignment and guiding mechanism for the valve element, e.g. so that it will reciprocate in a straight longitudinal path on the centerline of the valve seat and will remain properly angularly oriented with respect to that seat. A fairly conventional approach is illustrated in U.S. Pat. No. 2,912,000 to Green and also in U.S. Pat. No. 2,071,391 to Crowell. Each of these patents illustrates a valve body in which a more or less conventional spider structure is provided for sliding engagement with the valve stem. The legs of the spider are joined at their inner ends by a continuous ring. If the valve body, including the spider, is lined, e.g. with a polymeric material, and then subjected to thermal changes in use, the portion of the liner lining the inner ring of the spider structure can shrink upon and bind the valve stem, thereby foiling its own purpose of facilitating proper valve element movement. Such spiders are also typically short in longitudinal dimension and, thus, do not adequately prevent cocking.

U.S. Pat. No. 3,498,315 to Graves et al illustrates a different approach in which the valve element does not include a guided stem, but rather, is a simple ball-type element. This arrangement is undesirable, for example, in that it is impossible to guide a ball-type element as surely and accurately as a stemmed element. Thus, gravity may interfere with proper seating of the ball on its seat. Some limited guidance is provided by vein-like structures formed on the interior of the liner, but these offer only incomplete guidance and, in any event, make the liner more expensive and difficult to manufacture. U.S. Pat. No. 4,224,961 to Schnabel illustrates a similar scheme, except that separate plastic inserts are provided between the liner and the valve body to help define the guide structures.

U.S. Pat. No. 3,540,472 to Brady suggests the formation of the entire valve body, including its internal guide structure, from a single material, namely a suitable plastic. However, for many applications, it is necessary, or at least desirable, that the outer major portion of the valve body be formed of metal, with only a relatively small layer of liner material on the interior. U.S. Pat. No. 3,552,426 to Hester et al and U.S. Pat. No. 4,274,436 to Smith generally disclose plastic-to-metal interlock formations for valves, but do not address the specific problem of interlocking a liner with guide formations of a valve body.

SUMMARY OF THE INVENTION

The present invention provides a scheme whereby a very positive guidance system may be provided for a valve element, and the valve body interior, including the guide structures, can be lined with a material having substantially different thermal properties, but without the danger of the lining shrinking down upon and binding the valve element when subjected to temperature changes in use. In a valve according to the present invention, the valve body defines the usual longitudinal flowway. A plurality of guide formations, preferably integral with the valve body, extend radially into the flowway. The guide formations are discontinuous from one another at their radially inner ends. Liner means on the interior of the valve body follows the contour of the guide formations so that the portions of the liner means which cover respective guide formations are likewise discontinuous at their radially inner ends. This discontinuity, in and of itself, substantially reduces the aforementioned problem of shrinking of the liner. Thus, a preferred form of valve element may be used, specifically one including not only a closure portion but also an elongate valve stem surrounded and slidably engaged by the lined inner ends of the guide formations.

The shrinking problem can be further controlled by special anchoring elements in accord with the present invention. Each of the guide formations has a transverse bore therethrough, and through each of these bores there extends an anchoring element which adjoins the portions of the liner on opposite sides of the respective guide formation. Preferably, these anchoring elements are formed monolithically with the adjoining portions of the liner, e.g. by molding directly onto the appropriate portion of the valve body. The anchoring elements resist radially inward movement of the liner to cooperate with the discontinuity of the guide formations and their liner portions to eliminate shrinking problems as described above. Such anchoring elements may also help to control displacement of a liner due, for example, to negative pressures, over and above any thermal problems.

So well does the present invention control radially inward movement of the liner, e.g. due to thermal shrinking, that the inner ends of the lined guide formations, which slidably engage the valve stem, can be made substantially longer than the diameter of the valve stem, thereby ensuring extremely accurate guidance and the prevention of any cocking of the valve element with respect to its intended axis. The guide formations are preferably formed on one of two mating members which form the valve body, adjacent the interface of the two, and may have their inner ends projecting axially toward the other of the valve body members to further increase the effective length of the guide surfaces.

The valve element itself may be comprised of an inner metallic body and an outer coating of polymeric material or the like. It is well known that partial spherical, stemmed type valve elements may advantageously be formed with a concavity on the opposite side of the closure portion from the valve seat. See, for example, U.S. Pat. No. 1,940,999 to Ferlin et al and U.S. Pat. No. 4,203,466 to Hager. However, the present invention contemplates a particularly convenient and simple manner of forming such concavity. Specifically, while leaving the configuration of the inner body relatively simple, the molding or other formation of an annular bead or rim on the outer polymeric coating can serve to define the necessary concavity.

Accordingly, it is a principal object of the present invention to provide an improved lined check valve body.

Another object of the present invention is to provide such a valve body having lined guide formations which are discontinuous at their radially inner ends.

Still another object of the present invention is to provide an improved anchoring system for such lined guide formations.

Numerous other objects, features and advantages of the present invention will be made apparent by the following detailed description, the drawings and the claims.

DETAILED DESCRIPTION OF THE PREFERRED EMBODIMENT

Figure 1:
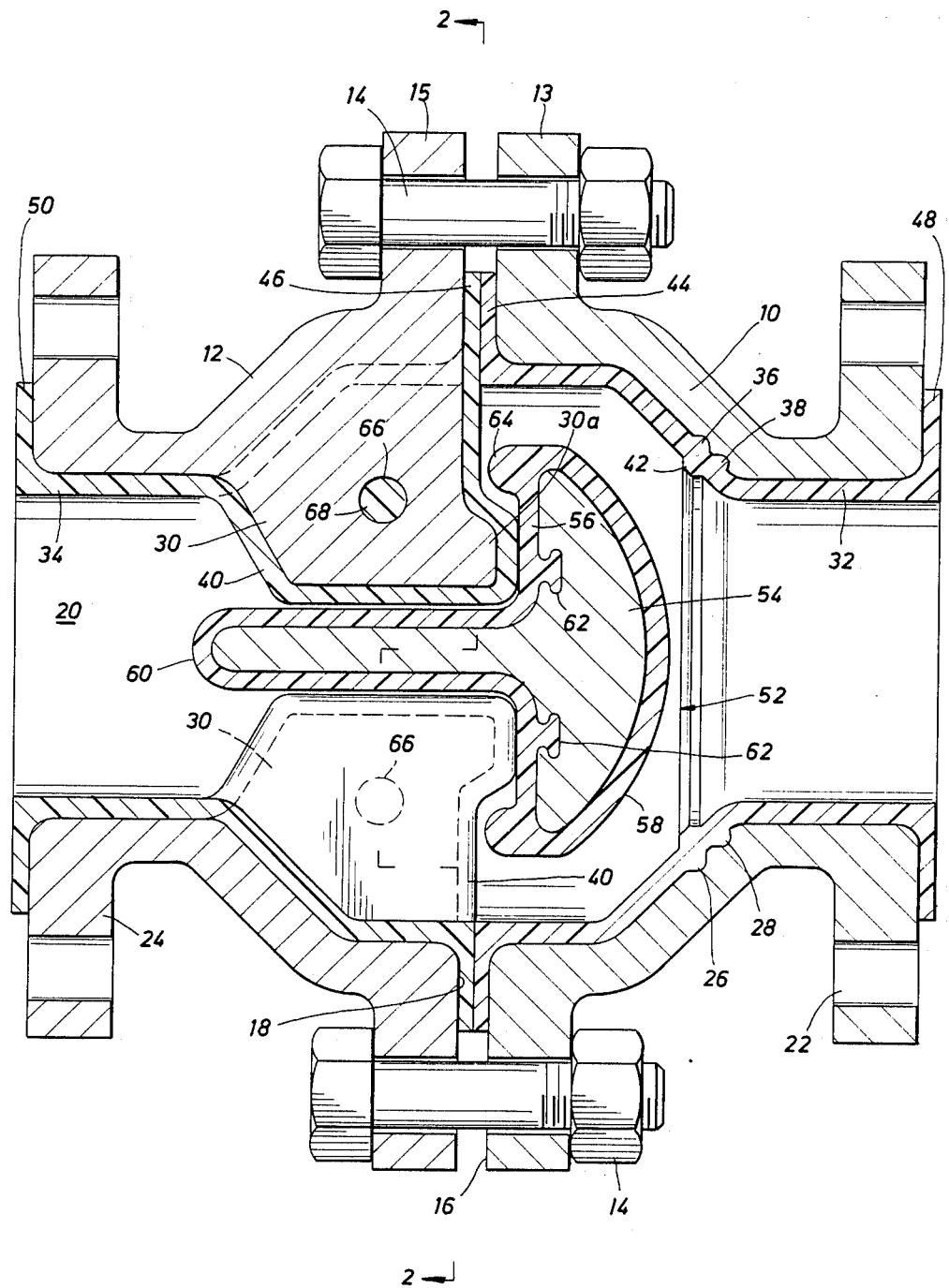
FIG. 1 is a longitudinal cross-sectional view through a check valve according to the present invention.
Figure 2:
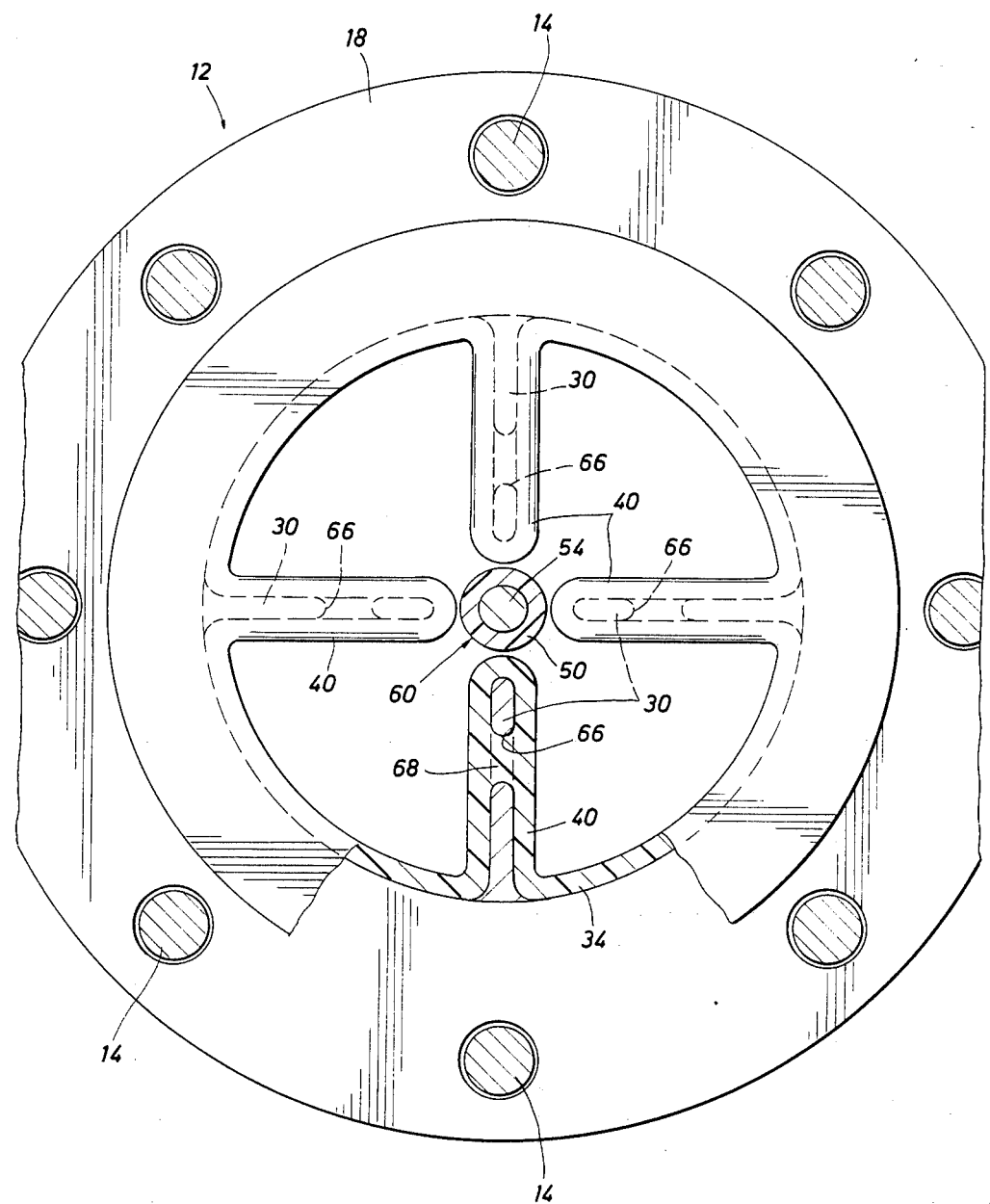
FIG. 2 is a transverse sectional view taken along the line 2—2 in FIG. 1.

FIGS. 1 and 2 illustrate an exemplary check valve assembly according to the present invention. The assembly includes a housing or valve body comprising first and second body members 10 and 12 respectively. Body members 10 and 12 are connected in end-to-end relation by nut and bolt assemblies 14 engaged with flanges 13 and 15 adjacent their respective opposed interface surfaces 16 and 18. The valve body defines a central longitudinal flowway 20 which is widened in the central area near interface surfaces 16 and 18 to accommodate the valve element and guide formations to be described hereinbelow while still permitting fluid flow when the valve is in its open position as shown. The valve body members 10 and 12 have respective flanges 22 and 24 on their longitudinally outermost ends for connecting the valve assembly into a conduit in a manner well known in the art.

As thus far described, body members 10 and 12 are mirror images of each other. Body member 10 differs from body member 12 in that it has a pair of internal annular grooves 26 and 28, the purpose of which will be described more fully below. Body member 12, on the other hand, has formed integrally therewith guide formations in the form of fins 30 extending radially inwardly into flowway 20. Preferably, fins 30 are not only integral with body 12 (which could be accomplished, for example, by welding) but are formed monolithically with body 12, i.e. body 12 and fins 30 may be cast as a single monolithic part, preferably of metal.

Valve body members 10 and 12 have respective liners 32 and 34 covering their interior surfaces. The two liners differ from each other insofar as each follows the contour of its respective body member. Thus, liner 32 has external annular beads 36 and 38 which fit into grooves 26 and 28 respectively to properly locate liner 32 in body member 10. Liner 34, on the other hand, has four pouch-like portions 40, each of which encases and closely follows the contour of a respective one of the fins 30. As seen by comparing the two figures, fins 30 are symmetrically arranged, stopping short of the centerline of the apparatus, and are discontinuous with one another at their radially inner ends. Pouch-like portions 40 of liner 34, closely following the contours of their respective fins 30, are likewise discontinuous with each other at their radially inner ends. In addition to the aforementioned differences between the two liners, which accommodate the differences in their respective valve bodies, liner 32 has an internal annular bead 42 which serves as the valve seat of the assembly.

The liners 32 and 34 also have respective annular lips or flanges 44 and 46 which extend radially outwardly partially across the respective interface surfaces 16 and 18 of the first and second valve body members. The liners 32 and 34 are preferably formed of a polymeric material, to be described more fully below, so that, when the valve body members 10 and 12 are firmly clamped together by nut and bolt assemblies 14, flanges 44 and 46 serve to seal between the two halves of the valve body. The liners have similar flanges 48 and 50 respectively at their longitudinally outermost ends for sealing with respect to pipe sections or the like which may be joined to the valve assembly in use.

The valve assembly further comprises a valve element 52 which has an inner body 54 of metal and an outer coating 56 of polymeric material similar to that of liners 32 and 34. The valve element thus comprised is configured to form a head or closure portion 58 defining an outwardly convex partial-spherical surface for sealing engagement with seat 42. Extending longitudinally away from head 58 is a valve stem 60 which is surrounded by and slidably engaged with the inner ends of fins 30 as lined by pouches 40. The outer coating 56 and inner body 54 are interlocked by modified dovetail-type formations 62. An annular rim 64 is integrally formed on outer coating 56 adjacent the outer periphery of head 58 and extends axially away from valve seat 42 so that it defines a concavity on the rear of head 58.

Because the inner ends or edges of the lined guide fins 30, which slidably engage valve stem 60, are discontinuous from one another, there is little danger of binding of valve stem 60 due to radially inward shrinking of liner 34, and more specifically pouches 40, upon thermal changes in use, even though the polymeric material of liner 34 has substantially different thermal properties from the metal of valve body member 12 and fins 30. It is thus possible to provide not only a fairly close sliding fit between the valve stem 60 and the inner ends of fins 30 as lined by pouches 40, but is further possible to provide relatively long inner edge surfaces for such sliding engagement, which prevents cocking of the valve element. As best shown in FIG. 1, the length of the inner edge of each fin 30, including the adjacent portions of its pouch 40, which slide against valve stem 60 are significantly longer than the diameter of the valve stem. Each fin 30 has its outer portion continuous with, and more specifically coplanar with, intersurface surface 18 of body member 12, but its inner end projecting longitudinally toward body member 10 as shown at 30a. This permits a further increase in the length of the inner guide surfaces without unduly obstructing the flowway 20 at or near its narrow or longitudinally outer end. Rim 64 on valve element 52 is sized to surround lined projections 30a to permit full retraction of the valve element.

To further enhance the effect of the discontinuity of the lined fins in alleviating shrinking/binding problems, each of the pouches 40 is firmly anchored to its respective fin 30. Specifically, each fin 30 has a transverse bore 66 therethrough. An anchoring element in the form of a plug 68 extends through each bore 66 and interconnects the portions of the respective pouch 40 on opposite sides of the respective fin 30. Preferably, the liner 34 and plugs 68 are molded or otherwise formed onto body member 12 as a single, continuous, monolithic body. It can be seen that plugs 68 will resist radially inward movement of pouches 40 due to thermal changes, as well as other factors, e.g. negative pressures. Thus, with no substantial chance of shrinking and binding problems, the long and fairly close-fitting inner end surfaces of the lined fins 30 provide extremely accurate positive guidance of the valve element 52, as it reciprocates toward and away from seat 42 in use, including proper angular orientation or prevention of cocking.

The present invention is particularly well adapted for check valve assemblies in which it is necessary or desirable to form the bulk of the valve body from a metal or the like, but in which it is desired to have the interior of the valve body lined with a suitable polymer, e.g. to decrease friction, resist wear, and prevent chemical interaction between the valve and the fluid being handled. Suitable polymers include various thermosetting and thermoplastic materials including, but not limited to: polypropylene, PVDF, and various forms of polytetrafluoroethylene. The use of the discontinuous fins 30 facilitates the molding of these and other liner materials, monolithically with the plugs 68, directly onto the valve body member 12.

Numerous modifications of the preferred embodiment described above can be made within the spirit of the invention. For example, although the invention is particularly well suited to plastic lined valves, certain aspects of the invention are useful in any check valve in which a valve body and its liner have different thermal properties, and even to situations in which displacement of the liner may be caused by non-thermal factors, such as negative pressures. Other modifications might include variations in the number or form of the guide formations, the general configuration of the valve body and its mode of attachment, etc. The valve element may be formed of a single material, either hollow or solid. Still other modifications will suggest themselves to those of skill in the art. Accordingly, it is intended that the scope of the invention be limited only by the claims which follow.

What is claimed is:

1. A check valve comprising:
   a valve body having a longitudinal flowway therethrough;
   a plurality of guide formations extending radially inwardly from said valve body into said flowway, said guide formations being discontinuous from one another at their radially inner ends;
   liner means on the interior of said valve body following the contour of said guide formations so that the portions of said liner means which cover respective guide formations are discontinuous at their radially inner ends, said liner means having thermal properties differing from those of said guide formations;
   said valve body having a valve seat longitudinally spaced from said guide formations;
   and a valve element longitudinally reciprocable in said flowway and including a closure portion opposing said valve seat and engageable and disengageable with said valve seat by means of such longitudinal reciprocation, and an elongate valve stem extending longitudinally from said closure portion and surrounded by and slidably engaged with the lined inner ends of said guide formations for guidance in such reciprocation.

2. The apparatus of claim 1 wherein said guide formations are integral with said valve body.

3. The apparatus of claim 2 wherein the inner end of each of said guide formations, including the adjacent portions of said liner means, has a longitudinal dimension substantially greater than the diameter of said valve stem.

4. The apparatus of claim 3 wherein said valve body comprises first and second body members connected in end-to-end relation and having opposing interface surfaces, said first body member having said valve seat therein and said second body member having said guide formations therein;
   said liner means comprising first and second liner sections lining said first and second body members respectively.

5. The apparatus of claim 4 wherein said guide formations are disposed contiguous said interface surface of said second body member and have their inner ends projecting axially toward said first body member.

6. The apparatus of claim 5 wherein said valve element has a rim about said closure portion extending axially away from said valve seat and sized to generally surround said projecting inner ends of said guide formations.

7. The apparatus of claim 4 wherein at least one of said liner sections extends onto the interface surface of the respective body member for sealing between said body members.

8. The apparatus of claim 4 wherein said valve seat comprises an annular bead on said first liner section.

9. The apparatus of claim 4 wherein each of said guide formations has a transverse bore, and further comprising an anchoring element extending through said bore and interconnecting portions of said liner section on opposite sides of said guide formation.

10. The apparatus of claim 9 wherein said second liner section and said anchoring elements form a continuous monolithic body.

11. The apparatus of claim 10 wherein said second body member and said guide formations comprise a single monolithic part.

12. The apparatus of claim 11 wherein said body members are metallic, and said liner sections are polymeric.

13. The apparatus of claim 2 wherein said valve element comprises an inner body and an outer coating, said outer coating forming a rim about said closure portion extending axially away from said valve seat.

14. The apparatus of claim 2 wherein each of said guide formations has a transverse bore, and further comprising an anchoring element extending through said bore and interconnecting portions of said liner means on opposite sides of said guide formation.

15. The apparatus of claim 2 wherein said liner means is polymeric.

16. The apparatus of claim 1 wherein the inner end of each of said guide formations, including the adjacent portions of said liner means, has a longitudinal dimension substantially greater than the diameter of said valve stem.

17. The apparatus of claim 1 wherein each of said guide formations has a transverse bore, and further comprising an anchoring element extending through said bore and interconnecting portions of said liner means on opposite sides of said guide formation.

18. The apparatus of claim 17 wherein said anchoring elements are monolithic with the adjoining portions of said liner means.

19. Check valve apparatus comprising:

a valve body having a longitudinal flowway therethrough;

a plurality of guide formations adjoining said valve body and extending radially inwardly therefrom into said flowway, each of said guide formations having a transverse bore;

said valve body having a valve seat longitudinally spaced from said guide formations;

liner means on the interior of said valve body—including said guide formations;

a plurality of anchoring elements each extending through a respective one of said transverse bores in said guide formations and interconnecting portions of said liner means on opposite sides of the respective guide formations;

and a valve element longitudinally reciprocable in said flowway and including a closure portion opposing said valve seat and engageable and disengageable with said valve seat by means of such longitudinal reciprocation, and an elongate valve stem extending longitudinally from said closure portion and surrounded by and slidably engaged with the lined inner ends of said guide formations for guidance in such reciprocation.

20. The apparatus of claim 19 wherein said guide formations are discontinuous from one another at their radially inner ends; and the portions of said liner means which cover said guide formations follow the contour of said guide formations so as to be similarly discontinuous at their radially inner ends.

21. The apparatus of claim 20 wherein said anchoring elements are monolithic with the adjoining portions of said liner means and said guide formations are integrally adjoined to said valve body.

22. The apparatus of claim 21 wherein said liner means and anchoring elements are polymeric.

23. The apparatus of claim 22 wherein said valve body member and said guide formations are metallic.

* * * * *